US006970071B2

(12) United States Patent
Hornung

(10) Patent No.: US 6,970,071 B2
(45) Date of Patent: Nov. 29, 2005

(54) METHOD AND DEVICE FOR ACQUIRING DATA

(75) Inventor: Hans-Georg Hornung, Waal (DE)

(73) Assignee: DaimlerChrysler AG, Stuttgart (DE)

( * ) Notice: Subject to any disclaimer, the term of this patent is extended or adjusted under 35 U.S.C. 154(b) by 27 days.

(21) Appl. No.: 10/738,974

(22) Filed: Dec. 19, 2003

(65) Prior Publication Data

US 2004/0178887 A1    Sep. 16, 2004

(30) Foreign Application Priority Data

Dec. 20, 2002  (DE) ............................... 102 60 176

(51) Int. Cl.[7] ............................................. G05B 1/00
(52) U.S. Cl. ................................................ 340/146.2
(58) Field of Search ...................................... 340/146.2

(56) References Cited

U.S. PATENT DOCUMENTS 5,548,270 A    8/1996  Kim et al.

FOREIGN PATENT DOCUMENTS

WO    WO 91/19259    12/1991
WO    WO 00/68700    11/2000

OTHER PUBLICATIONS

English Translation of German Office Action dated Oct. 29, 2003.

Primary Examiner—Margaret R. Wambach
(74) Attorney, Agent, or Firm—Crowell & Moring LLP

(57) ABSTRACT

A device for acquiring the maximum value (or the minimum value) of a multiplicity of measured values, having a multiplicity of measuring points for acquiring the measured values, an a data line for transmitting data values between the measuring points, at least one of the measuring points having a comparator for comparing a data value received on the data line with its own measured value, and being configured to transmit its own measured value on the data line only if said measured value is not smaller than the data value, wherein the data line is a serial line for transmitting the data value in the form of successive bits of decreasing significance, wherein the comparator is a serial comparator which compares the received bits of the data value with the identically significant bits of its own measured value, and wherein the measuring point is configured to transmit each bit of its own measured value which is detected as being larger than the corresponding received bit, until a comparison reveals that the bit of its own measured value is smaller than that of the received data value, and to then shut down the transmission of its own data value.

24 Claims, 3 Drawing Sheets

METHOD AND DEVICE FOR ACQUIRING DATA

CROSS-REFERENCE TO RELATED APPLICATIONS

This application claims the priority of German application 102 60 176.3, filed Dec. 20, 2002, the disclosure of which is expressly incorporated by reference herein.

BACKGROUND OF THE INVENTION

The present invention relates to a method and a device for acquiring data, in particular, for acquiring the minimum value or the maximum value of a multiplicity of measured values which are present at a multiplicity of measuring points.

A conventional method for generating such a maximum value or minimum value addresses in succession measuring points which are connected by means of a bus or the like to a control unit, for example, a micro-processor, in order to cause them to output their measured value to the control unit and subsequently determine, at the control unit, the maximum value or minimum value of the measured values. Such a method is technically complex as each individual measuring point has to have an interface which is capable of detecting when the respective measuring point is addressed by the control unit, and this interface gives rise to a considerable amount of data traffic on the bus on which the requests to the measuring points to supply a measured value and their responses have to be successively transmitted. A particularly high loading results if a packet-oriented bus has to be used, for example, because it is necessary to connect not only the measuring points but also data units which transmit or receive large quantities of data in a short time.

WO 00/68700 discloses a method and a device for deriving a maximum value or a minimum value from measured values which are generated at a multiplicity of measuring points, in which method and device the measuring points are not located in parallel on a bus and addressed by one control unit but rather connected in series along a data line so that each measuring point can receive data in each case from only one preceding point arranged upstream on the data line, compare it with its own measured value and pass on the respective larger value or smaller value to a succeeding point. In such an arrangement the need to address each measuring point individually is eliminated so that the individual measuring points also do not require an address decoder and can thus be simplified. The period of time which is necessary to acquire a maximum value or minimum value is however extremely long as the measuring points which are connected serially to one another each have to receive a data value completely from a preceding point before they carry out the comparison with their own measured value and pass on the value which is selected from the two values.

It would also be possible to reduce these delays by providing a parallel transmission of the data values between adjacent measuring points, but such a solution is complex and costly, in particular if the measuring points are used in an environment in which electromagnetic interference is frequent, and it is therefore necessary to shield the data line.

SUMMARY OF THE INVENTION

An object of the present invention is to specify a method for acquiring the maximum value or the minimum value of measured values which are acquired at a multiplicity of measuring points, which measured values permit rapid acquisition and which in particular do not require an address decoder at the individual measuring points.

The object is achieved in terms of the method in that a measuring point which serially receives a data value on the data line compares it with its own measured value and serially transmits its own measured value on the data line only if it is not smaller than the data value when the maximum value is being acquired, and not larger than the data value when the minimum value is being acquired, receives the bits of the data value in order of decreasing significance, compares the received bits of the data value with the identically significant bits of its own measured value and transmits each bit of its own measured value which is detected as being larger (when the maximum value is being acquired) or smaller (when the minimum value is being acquired), than the corresponding received bit, until a comparison reveals that the bit of its own measured value is smaller (when the maximum value is being acquired) or larger (when the minimum value is being acquired) than that of the received data value, and then shuts down the transmission of its own data value.

In a first embodiment of the method there is provision for each measuring point to receive from every other measuring point and to transmit to every other measuring point. In this embodiment it is possible for a measuring point which shuts down the transmission of its own data value to shut down completely the transmission of bits as in this case there must be a different measuring point on the data line whose measured value is more extreme, i.e. nearer to the maximum (or minimum) which is being sought, and which consequently continues with the transmission.

According to a second embodiment of the method, each measuring point receives from precisely one preceding point and transmits to precisely one succeeding point. In this embodiment, a measuring point which shuts down the transmission of its own data value must subsequently pass onto the succeeding point the bits of the data value which it has detected as being more extreme, said bits having been received from its preceding point, in order to ensure that said succeeding point receives a complete data value with the necessary number of bits.

The object is also achieved by a device for acquiring the maximum value (or minimum value) of a multiplicity of measured values, having a multiplicity of measuring points for acquiring the measured values, and a data line for transmitting data values between the measuring points, at least one of the measuring points having a comparator for comparing a data value received on the data line with its own measured value, and being configured to transmit its own measured value on the data line if said measured value is not smaller (or larger) than the data value, wherein the data line is a serial line for transmitting the data value in the form of successive bits of decreasing significance, wherein the comparator is a serial comparator which compares the received bits of the data value with the identically significant bits of its own measured value, and wherein the measuring point is configured to transmit each bit of its own measured value which is detected as being larger (or smaller) than the corresponding received bit, until a comparison reveals that the bit of its own measured value is smaller than that of the received data value, and to then shut down the transmission of its own data value.

A first embodiment of the device which corresponds to the first embodiment of the method has a data line which is continuous in terms of signaling equipment and which connects every measuring point to every other measuring point. This data line advantageously has a passive level which is set when all the measuring points transmit a passive bit value, and an active level which is set when only one of the measuring points transmits an active bit value. When the maximum value is determined, the passive level corresponds to a bit with the value "0", and the active level corresponds to a bit with the value "1", when the minimum value is determined the correspondence is interchanged.

In an embodiment of the device which corresponds to the second embodiment of the method, the data line has a multiplicity of sections which are separated in terms of signaling equipment and which each connect a measuring point to a preceding point or to a succeeding point. There is a first measuring point which has, as a preceding point, a control unit, and the preceding points of all the other measuring points are in turn measuring points. Likewise, the control unit is the point which succeeds a last measuring point, and the succeeding points of all the other measuring points are in turn measuring points.

The measuring points are also expediently connected by means of a clocked line. In the first embodiment of the device it is expedient for the clocked line to have, like the data line, an active and a passive level, and for each measuring point to be designed to switch over from outputting an active level on the clocked line to outputting a passive level if a bit which is to be transmitted on the data line by the measuring point is stabilized. If every measuring point indicates, by outputting the passive level, that it outputs a valid data bit, a control unit can detect, from the appearance of the passive level on the clocked line, that a valid data bit is present on the data line and can transfer it. The individual clock period therefore does not last longer than absolutely necessary so that a very high speed can be achieved when determining the extreme value.

In the second embodiment of the device, the clocked line is divided, once more in a similar way to the data line, into a multiplicity of sections which are separate in terms of signaling equipment and which each connect a measuring point to a preceding point or to a succeeding point. A section of the clocked line preferably runs between two data units which are also connected by means of a section of the data line, and the clock signal which is transmitted by a transmitter of each data unit has a delay of half a clock period in comparison with the lock signal which is received by the receiver of the same data unit. This measure permits the duration of the acquisition of the derived data value to be reduced once more.

As the operations to be carried out at the individual data units are, according to the invention, essentially simple single-bit operations, the data units according to the invention are particularly suitable for implementation in one or more ASICs.

Further features and advantages of the invention emerge from the following description of exemplary embodiments with reference to the appended figures, of which:

Figure 1:
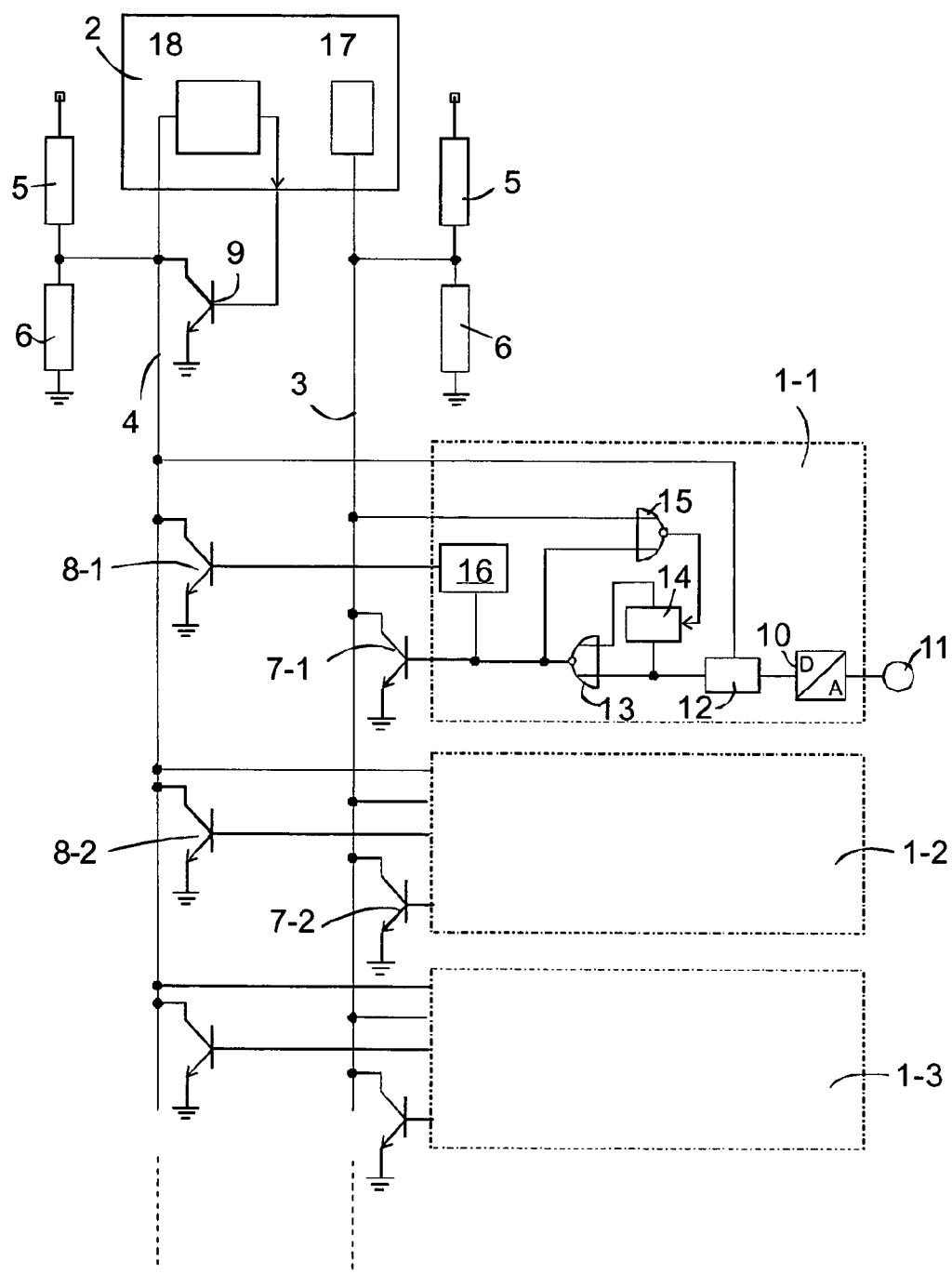
FIG. 1 shows a block diagram of a first embodiment of the device according to the invention for acquiring maximum or minimum values.

The block diagram in FIG. 1 shows a first embodiment of the acquisition device according to the invention having a multiplicity of measuring points 1-1, 1-2, . . . and a control unit 2, which are arranged in parallel on a data line 3 and a clocked line 4. The data line 3 and the clocked line 4 are each biased by means of voltage dividers composed of resistors 5, 6, with a passive level corresponding to the bit value 1, and can be connected to ground via transistors 7-1, 7-2, . . . , 8-1, 8-2, . . . , 9. As long as all the transistors on one of the lines are nonconductive, the line is at the high, passive level; as soon as one of the transistors on the respective line is conductive, the potential drops to ground, the "active level" in accordance with the bit value 0.

The measuring points 1-1, 1-2, . . . all have the same design shown in FIG. 1 by way of example for the measuring point 1-1. An analog/digital converter 10 is connected to an external sensor 11 in order to receive measured values from it. The output of the A/D converter 10 is connected to a shift register 12 for storing a digitized measured value. A clock input of the shift register 12 is connected to the clocked line 4 so that the shift register 12 outputs one bit in each period of the clock signal which is present on the clocked line 4. The bits are output here in the order of decreasing significance.

A first input of a NOR gate 13 is connected to the output of the shift register 12, the output of the NOR gate 13 drives the transistor 7-1, assigned to the measuring point 1-1, on the data line 3, as well as driving the data input of a RS flipflop 14. In addition, a delay circuit 16 is connected to the output of the NOR gate 13, the delay circuit 16 supplying, when respectively triggered by a pulse change at the output of the gate 13, a pulse to the assigned transistor 8-1 on the clocked line 4, which pulse makes the transistor 8-1 temporarily conductive.

The output of the RS flipflop is connected to a second input of the NOR gate 13 and to a first input of a NOR gate 15, the second input of which is connected to the data line 3. The output of the NOR gate 15 drives a trigger input of the RS flipflop 14.

The control unit 2 includes, inter alia, a shift register 17 which is connected to the data line 3, and a monoflop 18 which drives the transistor 9.

The minimum value of a set of measured values which are acquired by the measuring points 1-1, 1-2, . . . are acquired as follow. First, the monoflop 18 supplies a pulse with a time period $t_1$ to the transistor 9 which then draws the clocked line 4 to ground for a corresponding time period. The shift register 12 of each measuring point is triggered by the falling edge of the clock signal to output the most significant bit of the measured value stored in it. At this time, the flipflop 14 contains the value 0 in each measuring point so that the value which is output by the NOR gate 13 is the negation of the bit which is output by the shift register 12. That is to say, if the bit which is output by the shift register 12 has the value 1 in all the measuring points, the NOR gate 13 applies, in each case, a low level to the corresponding transistor 7-1, . . . so that the transistors 7-1, . . . are nonconductive and the data line 3 conducts the passive level 1. However, if the shift register 12 of a measuring point 1-i outputs a bit 0, the respective NOR gate applies a high level to the corresponding transistor 7-i, as a result of which the latter becomes conductive and draws the data line 3 to ground, i.e., to 0 level.

The 0 level on the data line 3 reaches an input of the NOR gate 15 of each measuring point. At those measuring points at which the flipflop 14 contains the value 0, the output of the NOR gate 15 therefore flips over from 0 to 1, and the flipflop 14 is triggered to transfer the value present at its input. If its value is 0, the state of the flipflop 14 does not change. However, if the bit 1 which is output by the shift register 12 is at a measuring point 1-j, it is apparent that the measured value of this measuring point 1-j cannot be the minimum value. In this case, the value 1 is stored in the flipflop 14.

If the output level of the inverter 18 has changed at one of the measuring points 1-k, the delay circuit 16, which holds the transistor 8-k open for as long as is necessary to possibly stabilize the potential on the data line 3, has therefore also been triggered before the expiration of the time period $t_1$. Each measuring point can in this way prolong the duration of a clock period on the clocked line 4 when necessary.

The subsequent rising of the potential again on the clocked line 4 triggers the monoflop 18 of the control unit 2, which outputs a second pulse of the length $t_1$ to the transistor 9 a short time thereafter. As a result, the shift register 12 of the measuring points are in turn triggered to output the stored bit with the next lowest significance. At those measuring points whose flipflop 14 still contains the value 0, the procedure described above is repeated. At those measuring points 1-k at which the flipflop 14 has assumed the value 1, where it is therefore apparent that their measured value cannot be the minimum value, the NOR gate 13 supplies the output value 0 irrespective of the value of the bit which is output by the shift register 12. The transistor 7-k, which is subsequently driven with 0 remains nonconductive so that the respective measuring point 1-k does not influence the data line 3.

A result of the described method of operation of the individual measuring points is that the bits of the smallest measured values of all the measured values acquired appear in succession on the data line 3 and are transferred into the shift register 17 of the control unit 2 for further processing.

Before a minimum value is determined again, the flipflops 14 are reset to 0.

It is possible to determine a maximum value of all the acquired measured values by, for example, inserting, in the device in FIG. 1, in each case an inverter between the A/D converter 10 and the shift register 12, and between the data line 3 and the shift register 17.

Figure 2:
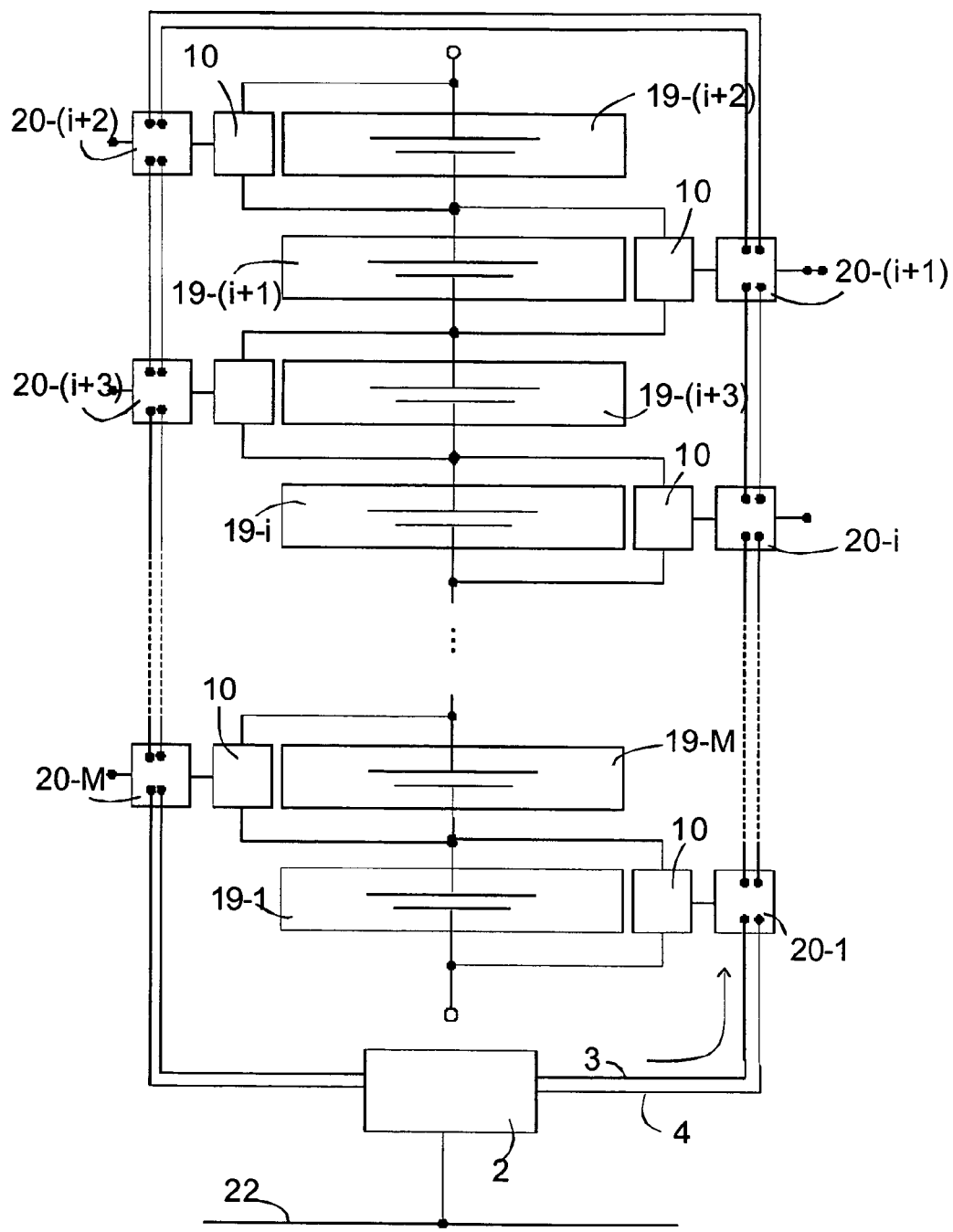
FIG. 2 is a block diagram of a fuel cell stack with an acquisition device which is connected thereto, according to the invention for acquiring the minimum value or maximum value of the terminal voltages of the individual fuel cells.

The block diagram in FIG. 2 shows a stack of M fuel cell 19-1 to 19-M which are connected in series and which are each assigned a measuring point 1-i according to a second embodiment of the acquisition device according to the invention, including an A/D converter 10 and an interface 20-i, i=1, . . . , M. The A/D converter 10 is connected in each case to the terminals of the assigned fuel cell 19-i in order to acquire its terminal voltage and supply to the interface circuit 20-i a digital value which is representative of the acquired voltage. A single-conductor data line 3 runs in a ring shape, starting from a control unit 2 in series via the interfaces 20-i and back to the control unit 2. The data line 3 is composed of a multiplicity of sections which are separated from one another in terms of signaling equipment, i.e., sections which each connect a transmitter of the control unit 2 to a receiver of the first interface 20-1 of the circuit, or a transmitter of an interface 20-i to a receiver of a following interface 20-(i+1), or to a receiver of the control unit 2 in the case of the last interface 20-M. The data line 3 therefore transmits only in one direction, in the counter-clockwise direction in FIG. 2, and each interface controls whether a signal which arrives at its receiver is passed on by it via its transmitter.

In the embodiment in FIG. 2, most sections of the data line 3 connect interfaces 20 of fuel cells 19 together; each fuel cell is connected to a fuel cell adjacent to its immediate neighbor in the series circuit of the fuel cells (i.e., every other fuel cell is connected). The interfaces are thus each connected in a floating fashion to the potential of the fuel cell assigned to them. The difference in potential between the interfaces which is to be bridged by each section of the data line 3 thus corresponds in each case to twice the terminal voltage of the fuel cells 19. As the difference in potential between interfaces 20-i, 20-(i+1) which are adjacent along the data line 4 is thus low, direct voltage isolation between them is easily possible, for example, using a capacitor (not illustrated) which is inserted into each section of the data line 3. Of course, it would also be possible to connect, on the data line 3, in each case the interfaces of fuel cells which are directly electrically connected to one another in the fuel cell stack, but in this case a difference in potential corresponding to the total output voltage of the fuel cell stack would have to be bridged in one section of the data line 3, which may make relatively complex means for direct voltage isolation, for example, an optocoupler, where necessary.

A clocked line 4 is routed in parallel with the data line 3 in a ring shape from the control unit 2 via the interfaces 20-1 to 20-M and back to the control unit 2. Like the data line 3, it includes a multiplicity of sections which are separated from one another in terms of signaling equipment and which each connect a transmitter of the control unit 2 or of an interface 20-i to a receiver of a following interface 20-(i+1) or of the control unit 2.

The interfaces 20-i are configured to distinguish instructions transmitted by the control unit 2 via the data line 3 from data, and evaluate them. This is possible, for example, by transferring data on the data line 3 in the form of trains or bursts which are chronologically spaced apart from one another, and the interfaces each interpreting a fixed number of bits at the start of each train as an instruction.

The control unit 2 is itself connected to a CAN bus 22 of a motor vehicle via which it receives, from a processor (not illustrated), instructions for supplying specific data values to the processor, or transmits these data values.

The method of operation of the device which is shown in FIG. 2 will now be explained with reference to an example. The case is considered in which the control unit 2 receives from the processor the instruction to supply the maximum of all the voltages applied to the terminal voltages of the fuel cells 19 at a fixed time. In response, the control unit 2 firstly transmits an instruction for the terminal voltage to be sampled and held, as described above, as part of a bit train on the data line 4 at all the interfaces 20-i. The control unit 2 then begins to transmit bit for bit, in synchronism with a clock signal which it transmits simultaneously via the clocked line 4 to the first interface 20-1, an N-bit-long data word whose bits are all zero, N being the resolution of the A/D converters 2. This data word can be transmitted in the same bit train as the instruction or in a bit train following it. It is not necessary for the control unit 2 to wait until the digitization of the obtained data values is finished before it transmits the first of the N bits "zero". It is sufficient that the most significant bit of the sampled data value is present at the interface 20-1 at the start of the transmission, and that the A/D converters 10 supply the further bits at at least the same rate at which the control unit 2 transmits. The processing which the interfaces 20-i carry out when they receive a data value from an upstream interface 20-(i−1), or from the control unit 2 in the case of the interface 20-1, is the same for all the interfaces and is described with reference to FIG. 3.

At the start, an internal register j of the interface 20-i is filled with the value N in step S1. The bit $r_j$ (step S2) which is received on the data line is compared (S3) with the identically significant bit $d_j$ of the data word D which is acquired by the A/D converter 10. If $d_j > r_j$, this means, irrespective of the values which the bits of R which are still to be transmitted have, that the data value D which is acquired by the A/D converter 10 must be larger than R. In this case, the method changes over to step S4, transmits the bit $d_j$ to the following interface 3-(i+1) and decrements the counter j in step S5. If the counter j has reached (S6) the value zero, this means that all the N bits have been processed and the method has ended. Otherwise, a further bit $r_j$ is received (S7), and the method returns to step S4, where this bit is passed on.

If the comparison in step S3 reveals that $d_j$ is not larger than $r_j$, the bit $r_j$ is passed on in step S8. A comparison (S9) follows to determine whether $d_j$ is smaller than $r_j$. If this is the case, it is automatically apparent that, regardless of the values of possibly following less significant bits of R or D, the data value R has to be larger than D so that the interface 20-i enters a loop in which, without a further comparison of values, whenever j is decremented (S10), a further bit $r_j$ is received (S12) and passed on (S13) until j=0 (S=1).

If the comparison in step S9 reveals that $d_j$ is not smaller than $r_j$, it is still undecided which of the values R and D is larger. After j has been decremented (S14) and there has been a comparison to determine whether j=0, the method therefore returns to step S2.

The data value R which is passed on by the interface circuit 20-i is therefore the respectively larger of the data value R received by it and the individual data value D obtained by itself.

Figure 3:
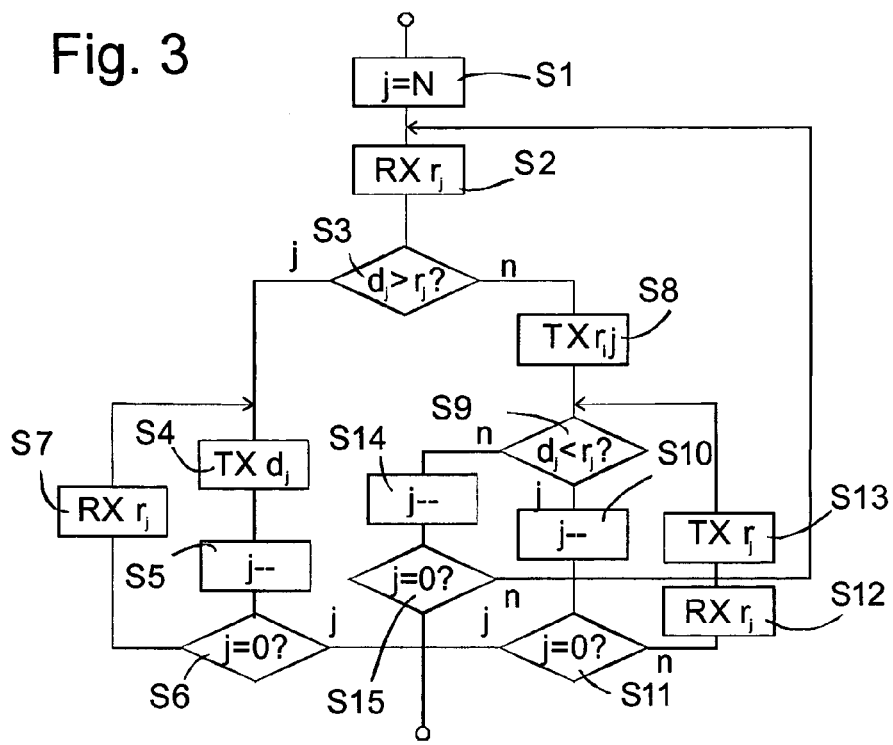
FIG. 3 is a flowchart of a method for acquiring the maximum value of the terminal voltages of the fuel cells.

If all the interfaces have carried out the processing according to FIG. 3, the control unit 2 finally receives, as an acquisition result, the maximum value of all the individual data values which are obtained by the measuring points 1.

The minimum value of all the data values which are obtained by the measuring points can be acquired in an analogous fashion if the neutral data value which is transmitted by the control unit 2 to the first interface 20-1 is composed of N bits "1" and the comparisons of the steps S3 and S9 are interchanged.

In one advantageous development of the method, the counter j is not used; the initialization step S1 and the decrementation operations S5, S10 and S14 are eliminated. Instead, the content of a shift register in which the acquired individual data value D is stored at the start of the method and which outputs the respectively most significant stored bit is shifted in each case by one bit to the left in the steps S5, S10 and S14, as a result of which the bits of D are also output successively and compared with the respectively identically significant bits of R until it is apparent which value is the larger (or smaller) of the two, and the respectively selected value is passed on as a new value R to the next interface circuit. The time period between bits of the value R which arrive successively at the interface 3 is applied as a stopping criterion in steps S6, S11 an S15: if the following bit remains longer than a predefined time period, the interface terminates the method. This method permits, inter alia, a rapid comparison with limited precision: the number of bits of R may be smaller than the resolution of the A/D converters 10; in such a case, less significant bits of the data values D remain unevaluated.

Figure 4:
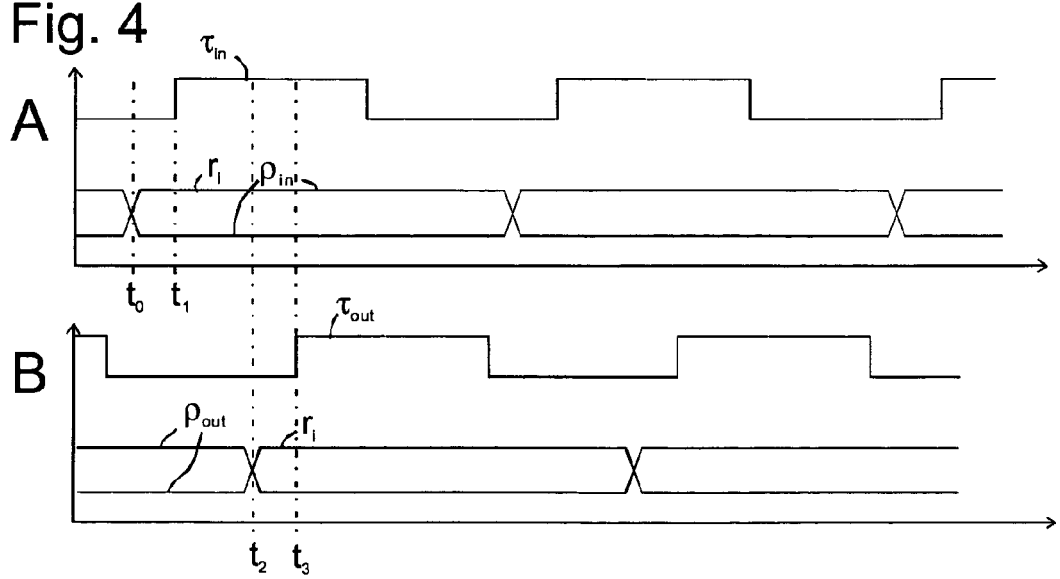
FIG. 4 shows the time profile of the clock signals and data signals in the device from FIG. 2.

FIG. 4 shows the time profile of the clock signals and data signals at the input (diagram A) or at the output (diagram B) of an interface 20-i. At the time $t_0$, in each case at the changeover from one bit of the data value R to be transmitted to the next bit, the data signal, designated by $\rho_{in}$ in FIG. 4, can change its level. With a short delay, which is necessary to stabilize the levels on the data line, the clock signal $\tau_{in}$ has, at the time $t_1$, a rising edge which causes the interface 20-i to transfer the value $r_j$ present at the input. The interface 20-i carries out the linking between the received bit $r_j$ and the corresponding bit $d_j$ of the individual data value D which is acquired from it, said linking being described as above with respect to FIG. 3. The result is available at the time $t_2$ and is output as level $r_j$ of the output data signal $\rho_{out}$, as shown in diagram B.

The interface 20-i generates a clock signal $\tau_{out}$ which is passed on to a downstream interface 20-(i+1) with a phase shift of half a period in comparison with the received clock signal $\tau_{in}$. If the clock signal $\tau_{in}$ drops away again at the time $t_3$, and $\tau_{out}$ has a rising edge, this causes the downstream interface 20-(i+1) to transfer the level $r_j$ output by the interface 20-i and to process it. As a result, the number of clock periods which one bit of the data value D requires in order to run through the series connection of the interfaces 20-1 to 20-M is only M/2, while M periods would be necessary with a clock signal which was present synchronously at all the interfaces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for acquiring the maximum value of measured values which are acquired at a multiplicity of measuring points comprising:
    receiving a data value serially on a data line at one of said measuring points, said data value being a first of said measured values;
    comparing said first of said measured values with a second of said measured values, said second of said measured values being previously obtained by said measuring point; and
    transmitting said second of said measured values serially on said data line only if said second of said measured values is not smaller than said first of said measured values.

2. The method of claim 1, wherein said measuring point receives bits of said first of said measured values in order of decreasing significance, compares said bits of said first of said measured values with identically significant bits of said second of said measured values, and transmits each bit of said second of said measured values which is detected as being larger than a corresponding bit from said first of said measured values, at least until a comparison reveals that said bit of said second of said measured values is smaller than that of said first of said measured values, and said measuring point then shuts down a transmission of said second of said measured values.

3. The method of claim 2, wherein each of said measuring points receives from every other measuring point and transmits to every other measuring point.

4. The method of claim 2, wherein each of said measuring points receives from precisely one preceding measuring point and transmits to precisely one succeeding measuring point.

5. The method of claim 4, wherein when one of said measuring points shuts down transmission of said second of said measured values, said measuring point transmits corresponding bits of said first of said measured values instead of not-yet-transmitted bits of said second of said measured values.

6. A method for acquiring the minimum value of measured values which are acquired at a multiplicity of measuring points comprising:
   receiving a data value serially on a data line at one of said measuring points, said data value being a first of said measured values;
   comparing said first of said measured values with a second of said measured values, said second of said measured values being previously obtained by said measuring point; and
   transmitting said second of said measured values serially on said data line only if said second of said measured values is not larger than said first of said measured values.

7. The method of claim 6, wherein said measuring point receives bits of said first of said measured values in order of decreasing significance, compares said bits of said first of said measured values with identically significant bits of said second of said measured values, and transmits each bit of said second of said measured values which is detected as being smaller than a corresponding bit from said first of said received values until a comparison reveals that said bit of said second of said measured values is larger than that of said first of said measured values, and said measuring point then shuts down a transmission of said second of said measured values.

8. The method of claim 7, wherein each of said measuring points receives from precisely one preceding measuring point and transmits to precisely one succeeding measuring point.

9. The method of claim 7, wherein each of said measuring points receives from precisely one preceding measuring point and transmits to precisely one succeeding measuring point.

10. The method of claim 9, wherein when one of said measuring points shuts down transmission of said second of said measured values, said measuring point transmits corresponding bits of said first of said measured values instead of not-yet-transmitted bits of said second of said measured values.

11. A device for acquiring the maximum value of a multiplicity of measured values comprising:
    a multiplicity of measuring points for acquiring said measured values; and
    a data line for transmitting data values between said measuring points;
    wherein at least one of said measuring points has a comparator for comparing one of said data values received on said data line with a measured value corresponding to said measuring point;
    wherein said measuring point is configured to transmit said measured value corresponding to said measuring point on said data line only if said measured value is not smaller than said data value,
    wherein said data line is a serial line for transmitting said data value in a form of successive bits of decreasing significance,
    wherein said comparator is a serial comparator which compares bits of said data value with identically significant bits of said measured value, and
    wherein said measuring point is configured to transmit each bit of said measured value which is detected as being larger than a corresponding received bit, until a comparison reveals that said bit of said measured value is smaller than that of said data value, and to then shut down the transmission of said data value.

12. The device of claim 11, wherein said data line connects every measuring point to every other measuring point.

13. The device of claim 12, wherein said clocked line has an active level and a passive level, and wherein each measuring point is designed to switch over from outputting an active level on said clocked line to outputting a passive level if a bit which is to be transmitted by said measuring point on said data line is stabilized.

14. The device of claim 11, wherein said data line has a passive level, which is set when all of said measuring points transmit a passive bit value, and an active level which is set when one or more of said measuring points transmit an active bit value, and wherein said passive level corresponds to a bit with a value "0", and the active level corresponds to a bit with a value "1".

15. The device of claim 11, wherein said data line further comprises a multiplicity of sections which each connect a measuring point to a preceding measuring point or to a succeeding measuring point.

16. The device of claim 15, wherein said clocked line comprises a multiplicity of sections which each connect a measuring point to preceding measuring point or to a succeeding measuring point, each measuring point passing on a clock signal, which is received from said preceding measuring point on a first section, with a delay $(t_2-t_0)$ of half a clock period to said succeeding measuring point on a second section.

17. The device of claim 11, wherein said measuring points are connected by a clocked line.

18. A device for acquiring the maximum value of a multiplicity of measured values comprising:
    a multiplicity of measuring points for acquiring said measured values; and
    a data line for transmitting data values between said measuring points;
    wherein at least one of said measuring points has a comparator for comparing one of said data values received on said data line with a measured value corresponding to said measuring point;
    wherein said measuring point is configured to transmit said measured value corresponding to said measuring point on said data line only if said measured value is not larger than said data value,
    wherein said data line is a serial line for transmitting said data value in a form of successive bits of decreasing significance,
    wherein said comparator is a serial comparator which compares bits of said data value with identically significant bits of said measured value, and
    wherein said measuring point is configured to transmit each bit of said measured value which is detected as being smaller than a corresponding received bit, until a comparison reveals that said bit of said measured value is larger than that of said data value, and to then shut down the transmission of said data value.

19. The device of claim 18, wherein said data line connects every measuring point to every other measuring point.

20. The device of claim 19, wherein said clocked line has an active level and a passive level, and wherein each measuring point is designed to switch over from outputting an active level on said clocked line to outputting a passive level if a bit which is to be transmitted by said measuring point on said data line is stabilized.

21. The device of claim 18, wherein said data line has a passive level, which is set when all of said measuring points transmit a passive bit value, and an active level, which is set when one or more of said measuring points transmit an active bit value, and wherein the passive level corresponds to a bit with value "1", and the active level corresponds to a bit with a value "0".

22. The device of claim 18, wherein said data line further comprises a multiplicity of sections which each connect a measuring point to a preceding measuring point or to a succeeding measuring point.

23. The device of claim 22, wherein said clocked line comprises a multiplicity of sections which each connect a measuring point to preceding measuring point or to a succeeding measuring point, each measuring point passing on a clock signal, which is received from said preceding measuring point on a first section, with a delay ($t_2-t_0$) of half a clock period to said succeeding measuring point on a second section.

24. The device of claim 18, wherein said measuring points are connected by a clocked line.

* * * * *